United States Patent
Wallrafen

[19]

[11] Patent Number: 6,070,337
[45] Date of Patent: Jun. 6, 2000

[54] PASSIVE MAGNETIC POSITION SENSOR

[75] Inventor: Werner Wallrafen, Hofheim, Germany

[73] Assignee: VDO Adolf Schindling AG, Frankfurt, Germany

[21] Appl. No.: 08/999,659

[22] Filed: Oct. 8, 1997

[30] Foreign Application Priority Data

Nov. 25, 1996 [DE] Germany .......................... 196 48 539

[51] Int. Cl.⁷ .................................................... G01B 7/00
[52] U.S. Cl. .................. 33/708; 33/DIG. 1; 324/207.11; 324/207.24
[58] Field of Search ................................ 33/708, DIG. 1, 33/706; 324/207.24, 207.25, 207.11

[56] References Cited

U.S. PATENT DOCUMENTS

| | | | |
|---|---|---|---|
| 5,074,053 | 12/1991 | West ........................................... | 33/708 |
| 5,442,865 | 8/1995 | Wallrefen ................................... | 33/708 |
| 5,798,640 | 8/1998 | Gier et al. .................................. | 33/708 |

FOREIGN PATENT DOCUMENTS 4309442  9/1994  Germany .

*Primary Examiner*—Christopher W. Fulton
*Attorney, Agent, or Firm*—Martin A. Farber

[57] ABSTRACT

A passive magnetic position sensor, has a substrate with a resistance network arranged on it, and a contact structure which is associated with the resistance network and which can be deflected under the action of a magnet device. An electric connection which is dependent on the position of the magnet device is produced between resistance network and contact structure. In order to provide a position sensor which has a high resolution, operates with a little wear, and is constructively simple to produce, the contact structure is developed as contact-spring structure, and the junction points of the resistance network are connected to contact surfaces also applied on the substrate. The contact-spring structure is arranged at a constant distance from the contact surfaces, the latter entering into contact with the contact-spring structure under the action of the magnet device. At least the contact-surfaces and the contact-spring structure are enclosed in a tight housing, and the magnet device is movable outside the tight housing. A stepped output signal is tapped off from the contact structure as a function of the position of the magnet device.

32 Claims, 8 Drawing Sheets

PASSIVE MAGNETIC POSITION SENSOR

FIELD AND BACKGROUND OF THE INVENTION

The present invention relates to a passive magnetic position sensor consisting of a substrate with a resistance network applied to the substrate, and of a contact structure associated with the resistance network and which can be deflected under the action of a magnet device, whereby an electric connection which is dependent on the position of the magnet device is produced between resistance network and contact structure.

Such a position indicator is known from Federal Republic of Germany 43 09 442 C2. In that case, the resistance network and the contact structure are arranged on a substrate. An electric connection between resistance network and contact structure on which the output signal corresponding to the position of the moved object is tapped off is effected via a second conductive substrate. Either one or the other substrate is deflected by a magnet device which is connected to a movable object, the position of which is determined by virtue of the fact that the two contact each other, and an electric connection is formed between resistance network and contact structure.

Due to the mutual arrangement of resistance network and contact structure, the resolution of the position sensor is limited. Since two contact junction points are provided for making the electric connection, such a contact system does not always operate reliably.

SUMMARY OF THE INVENTION

It is an object of the invention to provide a position indicator which operates reliably and with little wear, is of high resolution, and is structurally simple to produce.

According to the invention, the contact structure is developed as contact-spring structure (8) and the junction points of the resistance network (2) are connected with contact surfaces (4) which are arranged on a substrate (1). The contact-spring structure (8) is located at a constant distance from the contact surfaces (4) which come into contact with the contact-spring structure (8) under the action of a magnet device (11). At least the contact surfaces (4) and the contact-spring structure (8) are contained in a tight housing (1, 12), and the magnet device (11) is movable outside of the tight housing (1, 12). A stepped output signal is obtainable at the contact-spring structure (8) as a function of the position of the magnet device (11).

The advantage of the invention is that the position sensor has a higher reliability of contact and at the same time a higher resolution, because the resistance network and the contact-spring structure contact each other directly. The contact-spring structure, in this connection, can be any structure which in any way has tongue-like spring elements, whether these spring elements be placed on individually or in combination with several spring elements as a one-piece structure. The improvement in the contactibility results also from the contact surfaces applied to the substrate, whereby a vibration-free and strong construction of the position sensor is possible with only small dimensions. This is particularly advantageous for use in motor vehicles. It can be used in many ways, both as 2-pole rheostat and as a 3-pole potentiometer.

The resistance network is produced either as film-like resistance path by thin-film or thick-film technique, or as separate resistors of doped semiconductor material such as silicon or germanium by separately mounted fixed resistors or separate film resistors. In order to increase the precision, the resistance network (2) can be trimmed.

According to one feature of the invention, conductive paths (3) are arranged at predetermined distances apart along the substrate (1), and the end of each conductive path (3) forms one of the contact surfaces (4).

Also by a feature of the invention, the resistance network (2) is developed as a film-shaped resistance track.

Still further according to a feature of the invention, the resistance track (2) has a meander-shaped structure.

Furthermore, the invention provides that the contact surfaces (4) are connected directly to the meander-shaped structure of the resistance track.

Yet further, the resistance track (2) is produced by thin-film technique.

The invention also provides that the resistance track (2) is produced by thick-film technique.

The contact surfaces are advantageously formed by conductive paths (3) which are arranged in whole or in part on the resistance track (2).

As an alternative, the conductive paths (3) can be arranged at predetermined distances apart directly on the substrate, the paths being covered in part by the resistance track and the uncovered part of each conductive path forming the contact surface.

Particularly when the resistance tack is developed as a film-shaped resistance track, the conductive paths permit an accurate tapping-off of an output signal.

According to a feature of the invention, the conductive paths (3) are partially covered by the resistance track (2), and the end of each conductive path (3) forms a contact surface (4).

Also, the invention provides a feature wherein the resistance track (2) consists of separate individual resistors.

Still further according to the invention, the individual resistors are produced from doped semiconductor material.

Yet further, by a feature of the invention, the individual resistors are separately mounted fixed resistors.

Also, with the invention, the individual resistors are separate film resistors.

Still, by another feature of the invention, the conductive paths (3) are developed with lower resistance than the individual resistors of the resistance track (2).

For a further improvement of the reliability of the contact resistance, the contact surfaces (4) on the substrate (1) and on the contact springs are provided with a layer of a noble metal.

In this case, the contact paths are of lower resistance than the individual resistors of the resistance network.

The substrate (1) is non-conductive, and consists in this connection of a ceramic, glass or plastic plate. However, other materials, such as silicon and epoxide circuit-board material are also conceivable. An electrically insulated metal substrate can also be used.

According to a feature, the invention provides that the contact-spring structure (8) consists of separate contact springs (18).

Also according to the invention, the contact-spring structure (8) is a one-piece flexure-beam structure.

Still further, the contact-spring structure (8) consists of soft-magnetic material.

Moreover, the contact-spring structure (8) consists of non-magnetic material which is provided with at least a magnetic layer.

Yet further, the invention provides that the contact-spring structure (8) is provided with a noble-metal layer at least on its electric contact surfaces.

A feature of the invention is that at least two contact springs (9) of the contact-spring structure (8) are actuated simultaneously by the magnet device (11).

A further feature of the invention is that the contact-spring structure (8) and the substrate (1) are made of the same material.

The housing is advantageously formed by use of the insulating substrate as housing wall, the latter being closed by a housing cover (12).

Another feature of the invention is that the substrate (1) and the housing cover (12) consist of material having the same or similar coefficients of thermal expansion.

Also, the invention provides that the housing cover (12) and the substrate (1) are tightly soldered, welded or bonded together.

Still further according to a feature of the invention, the substrate (1) and the contact-spring structure (8) consist of semiconductor material.

As an alternative, the substrate and the contact-spring structure can be tightly extrusion-covered or encapsulated in a plastic housing.

According to a feature of the invention, the magnet device (11) is prestressed against the outer side of the housing (1, 2) so that it is movable with light contact.

Still further, another inventive feature is that the prestressing is produced by a spring element (14) which at the same time serves to receive the magnet device (11).

Furthermore, the invention provides that at least one electric connection (5) of the resistance network (2) and an electric connection (10) of the contact-spring structure (8) are conducted sealed-off from the outside.

BRIEF DESCRIPTION OF THE DRAWING

The invention permits of numerous embodiments, one of which will be explained in further detail on basis of the drawing, in which.

The same features are provided with the same reference numerals in all figures.

DETAILED DESCRIPTION OF THE PREFERRED EMBODIMENTS

Figure 1:
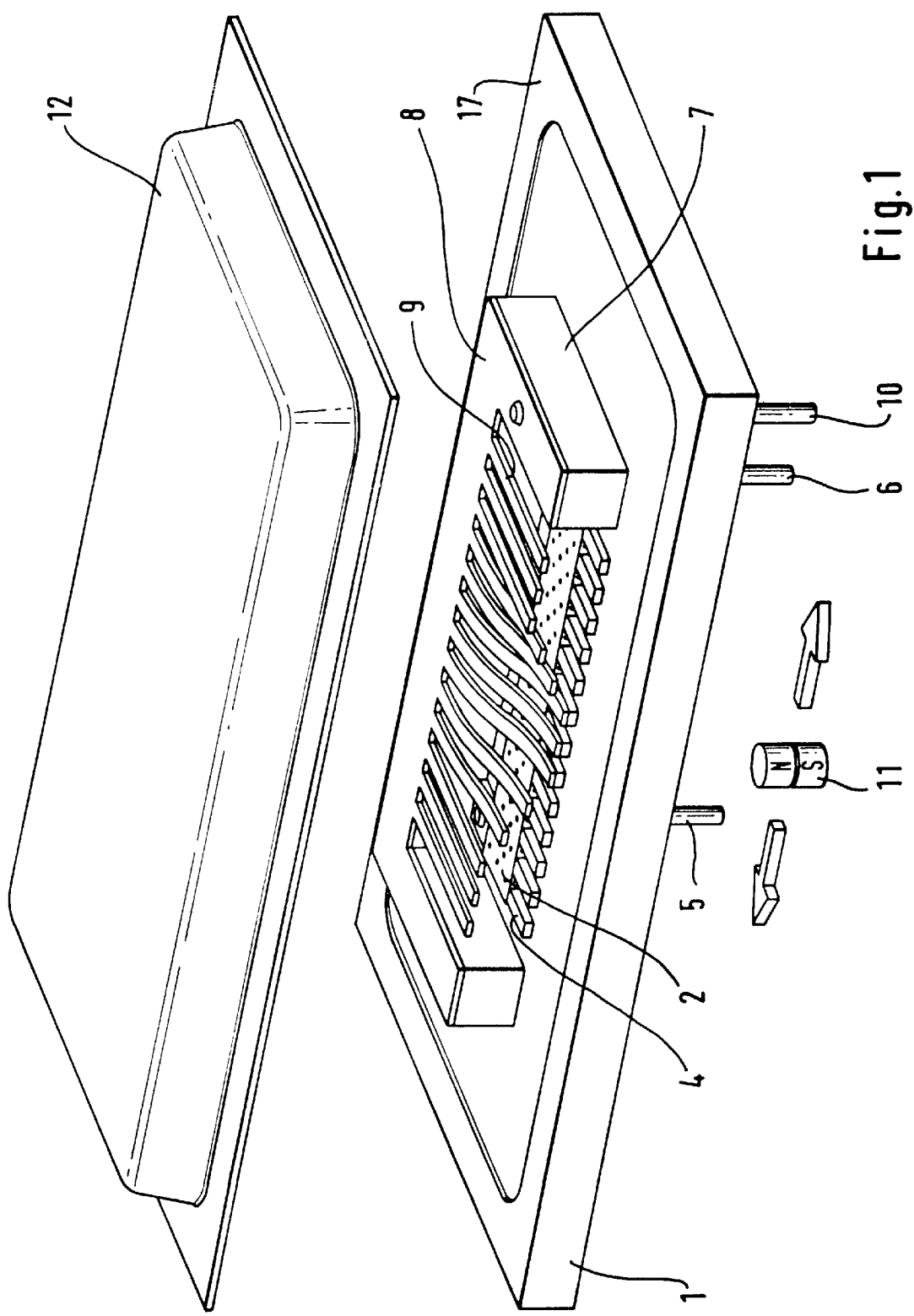
FIG. 1 is a first embodiment of the position sensor of the invention as potentiometer.

FIG. 1 diagrammatically shows the construction of a linear passive magnetic position sensor based on a thick-film arrangement in the form of a potentiometer. A non-magnetic substrate 1 bears a resistance network in the form of a film-shaped resistance track 2 which extends between electric connections 5 and 6.

Figure 2:
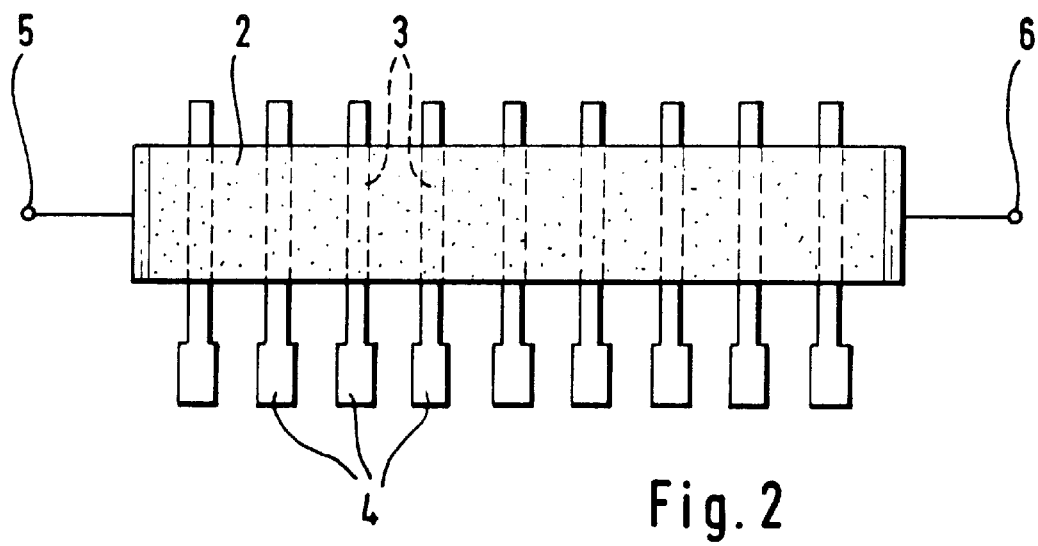
FIG. 2 is a plan view of the resistance track with conductive paths.

As can be noted from FIG. 2, a plurality of conductive paths 3 are arranged parallel to each other at equal distances apart on the substrate below the resistance path 2. These conductive paths 3 are located directly on the substrate, and perpendicularly to the resistance track 2. The conductive paths 3 are covered in part by the resistance track 2. In this connection, the end of each conductive path 3 forms a contact surface 4 which is coated with gold or silver.

Figure 3:
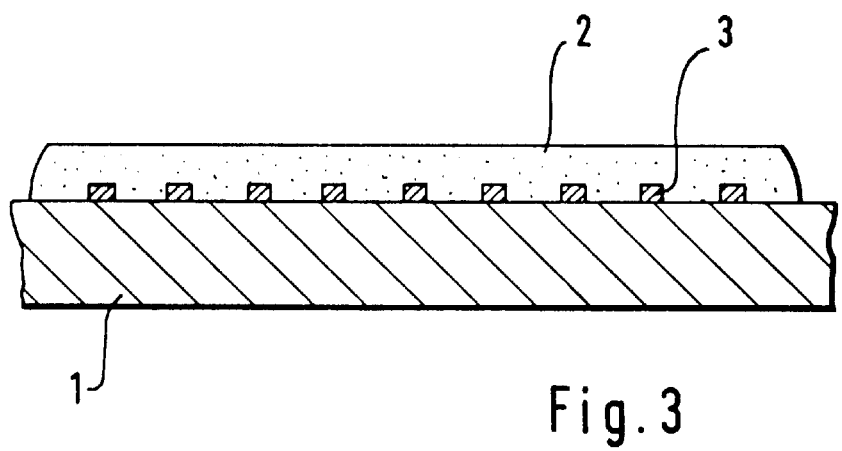
FIG. 3 is a section through the resistance track with conductive paths.

The sectional view in FIG. 3 shows that the conductive paths 3 are completely surrounded in the region of the resistance track 2 by the latter so as to assure a dependable electrical contacting. In accordance with FIG. 1, a spacer 7 is arranged on the substrate 1 parallel to the resistance track 2. On the spacer 7, a single-piece, comb-shaped flexure-beam structure 8 is disposed in the form of a soft-magnetic foil.

As an alternative to this, the flexure-beam structure 8 consists of non-magnetic material which is provided with a magnetic layer.

The comb-shaped soft-magnetic flexure-beam structure 8 consists of unilaterally supported, freely movable flexure beams 9. The flexure beams 9 are coated galvanically with a layer of gold or silver in order to reduce contact resistance.

The spacer 7 holds the freely movable ends of the flexure-beam structure 8 at a well-defined distance from the contact surfaces 4.

The freely movable ends of the bending beams 9 are arranged overlapping the contact surfaces 4. In this connection, the flexure-beam structure 8, which is developed as soft-magnetic foil, is itself electrically conductive and is connected to the outside electric connection 10.

As already mentioned, the resistance track 2 is connected electrically to ground and the operating voltage $V_B$ by the connections 5 and 6. The signal voltage $V_{OUT}$ of the position indicator can be tapped-off via the electric connection 10 which is connected to the flexure-beam structure 8. The signal voltage $V_{OUT}$ is variable from 0 V to $V_B$, is proportional to the resistance R of the track 2, and represents the position of a permanent magnet 11 which has undergone a corresponding displacement S, or angular displacement in the case of a circular track 2.

The permanent magnet 11 is arranged outside the housing 1, 12 and is movable with respect to the opposite side of the substrate 1 bearing the resistance track 2. The magnet 11 is moved in the region of the overlapping of the contact surfaces 4 with the freely movable ends of the unilaterally supported flexure-beam ends 9. The permanent magnet 11 can, in this connection, be prestressed by a spring in such a manner that it is movable with contact along the housing outer side, for instance the substrate outer side.

Figures 4A, 4B:
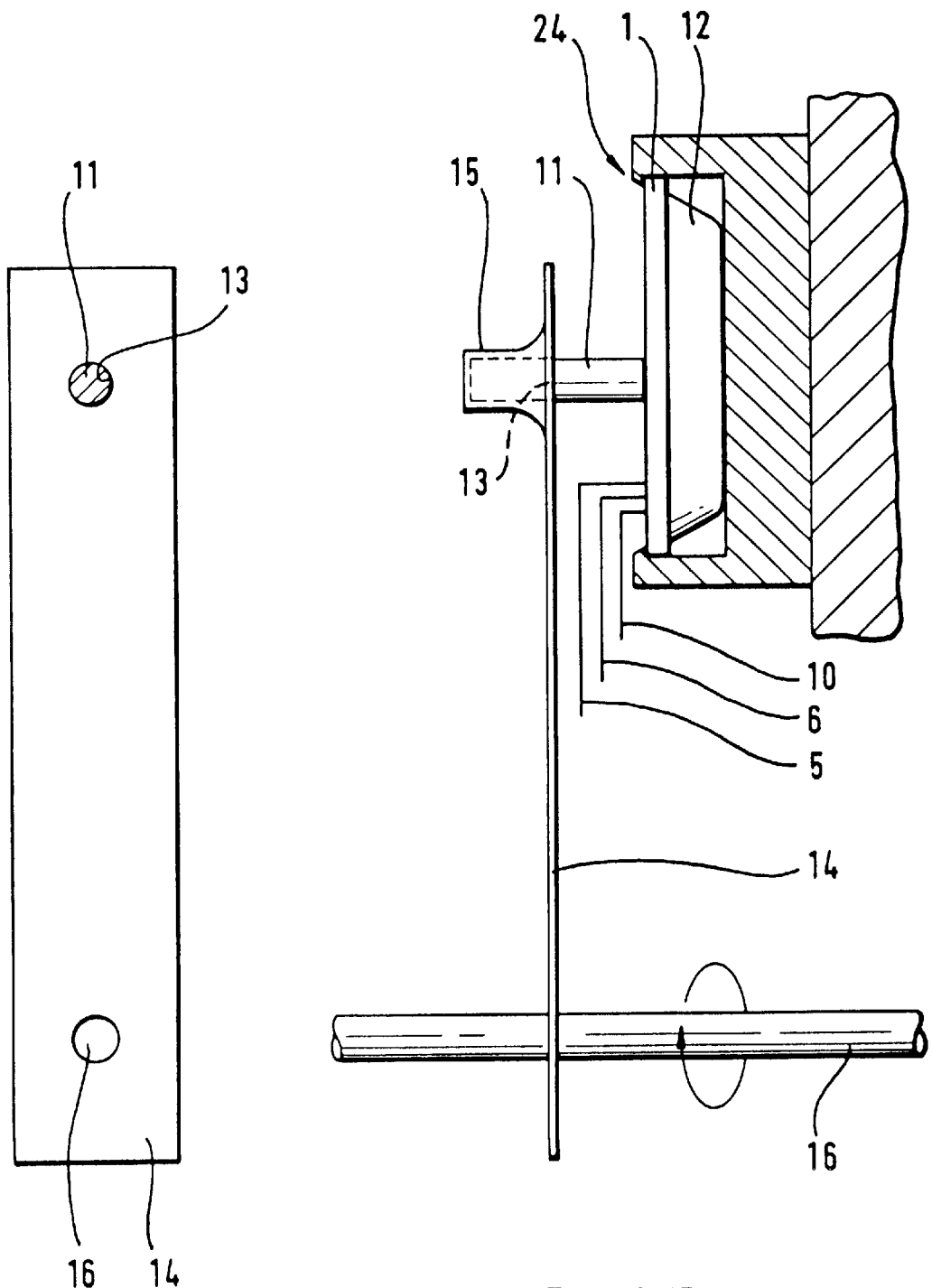
FIGS. 4A and 4B show an arrangement of the magnet device on the movable object in plan and side view.

The construction is shown in plan view and side view in FIG. 4.

The position sensor, which is fastened at the place of installation by means of a clip device 24 (FIG. 4B) is shown only with the aid of the substrate 1 in the housing cover 12 and the electric connections 5, 6, 10. The permanent magnet 11 is arranged force-locked in a sleeve 15 in an opening 13 in a leaf spring 14. The leaf spring 14 surrounds, at the end opposite the attachment of a magnet, a pivot pin 16 which is connected with the movable object. A linear position measurement by linear displacement of the leaf spring 14 is also possible.

Figure 5:
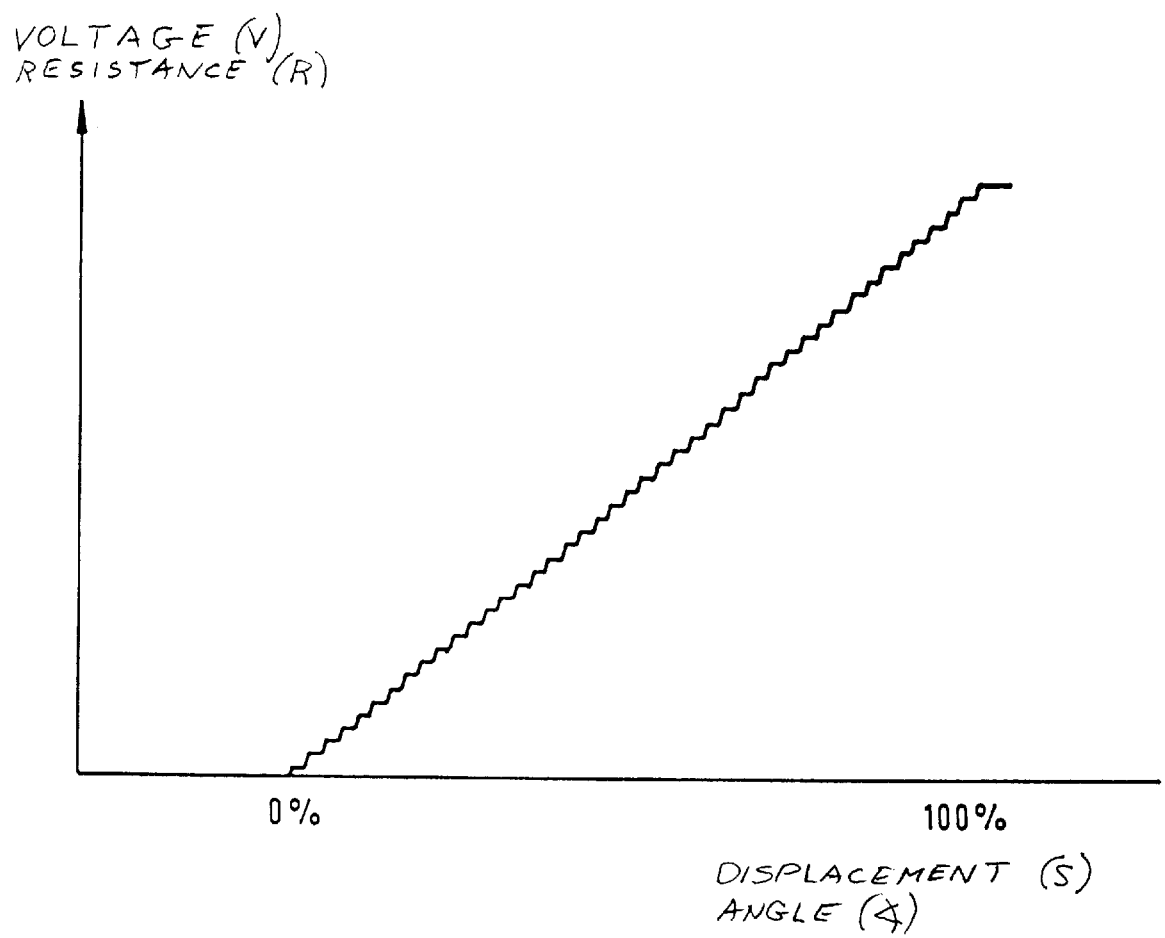
FIG. 5 is a graph which shows the output signal of the position sensor of the invention.

The freely movable ends of the flexure beams 9 of the flexure-beam structure 8 are pulled by the magnetic field of the permanent magnet 11 onto the contact surfaces 4 and contacted. Corresponding to the position of the permanent magnet 11, an electric connection is produced with the corresponding resistors of the resistance network and the signal voltage $V_{OUT}$ corresponding to this position is tapped-off. In this connection, a stepped output signal is produced, as shown in FIG. 5 and as demonstrated by the schematic representation of FIG. 10.

The width of the permanent magnet 11 is so dimensioned that several freely movable ends of the flexure-beam structure 8 which lie alongside of each other are contacted simultaneously with the corresponding contact surfaces 4 and thus act redundantly, so that interruptions in contact do not lead to the complete absence of the signal of the measurement system.

Figure 10:
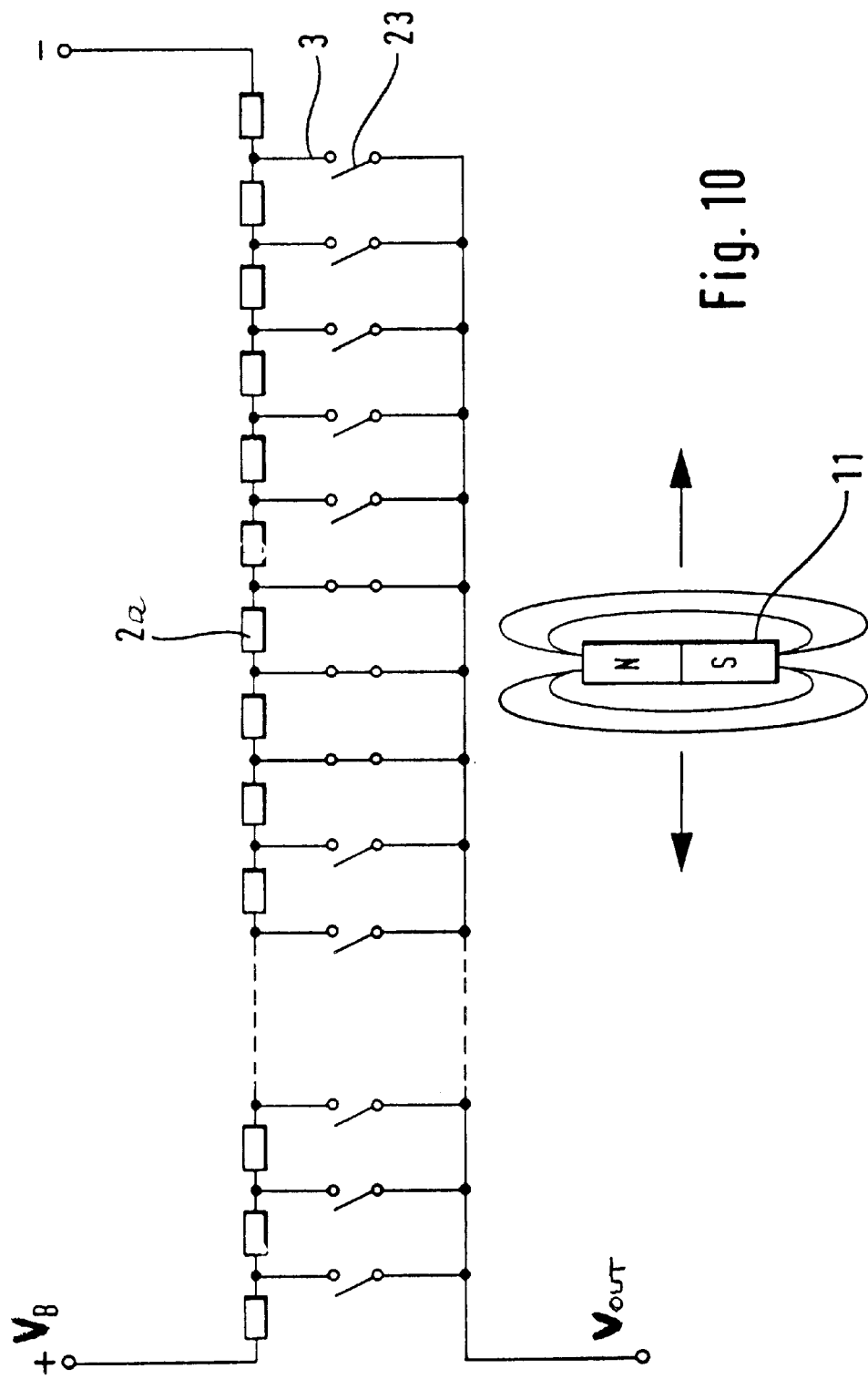
FIG. 10 is an electrical equivalent circuit diagram of the position sensor.

This is again shown in the electrical equivalent circuit diagram of the position sensor in FIG. 10.

The individual resistors of the resistance network can, as described, be formed as the track 2 or as separate individual resistors 2a.

The contacting of the flexure-beam elements 9 with the contact surfaces on the conductive paths 3 leads to the closing of a switch 23, as the result of which the output signal $V_{OUT}$ is produced.

The spacer 7 is fastened by a temperature-resistant, gassing-free self-adhesive foil both to the flexure-beam structure 8 and to the insulating substrate 1. In order to produce a direct electric connection, the spacer 7 can be metallic.

The spacer 7 can preferably also be made of the same material as the substrate 1.

Furthermore, a transversely flexed flexure-beam structure 8 can be used to obtain the spacing of the flexure beams 9 from the contact surfaces 4.

The insulating substrate 1 bearing the resistance track 2 and the soft magnetic foil 8 consists of a ceramic board. However, the use of glass or plastic supports or glass-coated or insulation-coated metal plates as well as silicon or epoxide circuit-board material is also conceivable.

The insulating substrate 1, which bears the resistance track 2, the conductive paths 3 with the contact surfaces 4, the spacer 7 as well as the flexure-beam structure 8, serves at the same time as housing wall of the position sensor which is closed by a housing cover 12.

In one embodiment the spacer 7 and the flexure-beam structure 8 are pressed with the housing cover 12 against the insulating substrate 1 and thus additionally fixed in position.

The material of the housing cover 12 and the material of the substrate 1 have, in this connection, the same or a similar coefficient of thermal expansion and can be soldered, welded or bonded together.

In case of the use of a metallic housing cover 12, the cover can be completely tinned in order to protect against corrosion and improve the solderability.

Instead of the metallic housing cover 12, a solderable metallized ceramic cover can also be used.

Another possibility consists in bonding the housing cover 12 to the substrate 1 by adhesive or a meltable foil.

A metallized layer 17 is disposed as surrounding edge on the insulating substrate 1, and serves for the encapsulating of the position sensor. In order to improve the solderability, the metal layer 17 is tinned.

In order to produce the electric connections 5, 6, 10, pins are passed through the insulating substrate 1 and hermetically sealed there, and thus soldered or welded in corrosion-resistant manner with the resistance track 2 and the flexure-beam structure 8.

As an alternative, however, connecting wires 21 can also be conducted outward via, in each case, a tight glass lead-through, each glass lead-through extending either through the substrate 1 or through the housing cover 12.

Figure 9:
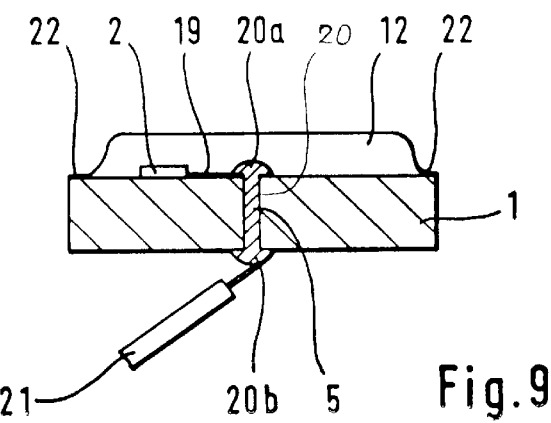
FIG. 9 shows a contacting of the electrical connections.

In another embodiment, such as is shown in FIG. 9, the passage holes for the electric connections, for instance connection 5 in substrate 1 (or the housing cover 12), can be sealed-off by soldering them closed by filling the passage hole with solder (20) without connecting wires. A resultant solder point 20b serves at the same time as electrical connection for the wires 21 fed from the outside. In this way, moisture is dependably prevented from penetrating through the passage holes into the position sensor. The resistance track 2 is connected with the solder point 20a by a connecting conductive path 19 present on the substrate 1.

In the region of the surrounding edge 22, substrate 1 and housing cover 12 are soldered, welded, or bonded together, as described, by the metallized layer 17.

Figure 6:
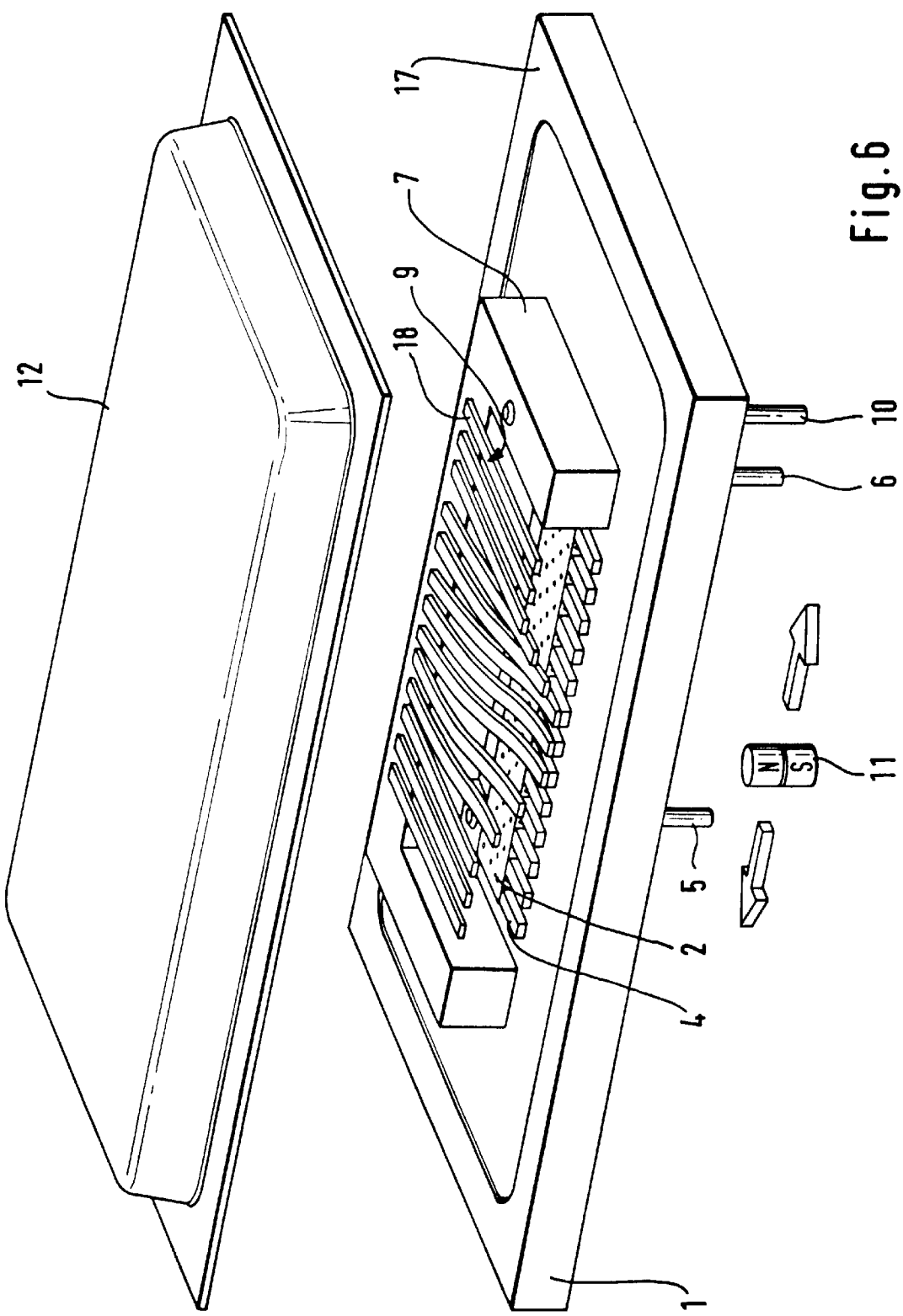
FIG. 6 shows the position sensor of the invention with individual flexure-beam elements.

Instead of the single-piece flexure-beam structure 8 described, individual flexure-beam elements 18 can be used (FIG. 6). These flexure-beam elements 18 also consist of a soft-magnetic foil and are electrically conductive. They are also fastened on the spacer 7 by means of a self-adhesive foil. The flexure-beam elements 18 are so dimensioned that they move back under their own spring force without additional aid upon abatement of the action of the magnet. This automatic restoration applies also to the flexure-beam structure described above.

The flexure-beam elements 18 are connected electrically to the tap 10 for the supplying of the position signal $V_{OUT}$. These flexure-beam elements 18 may either consist of soft magnetic material or of a non-magnetic material which is provided with magnetic layers. The flexure-beam elements are in this connection also coated in part with a noble metal.

Figure 7:
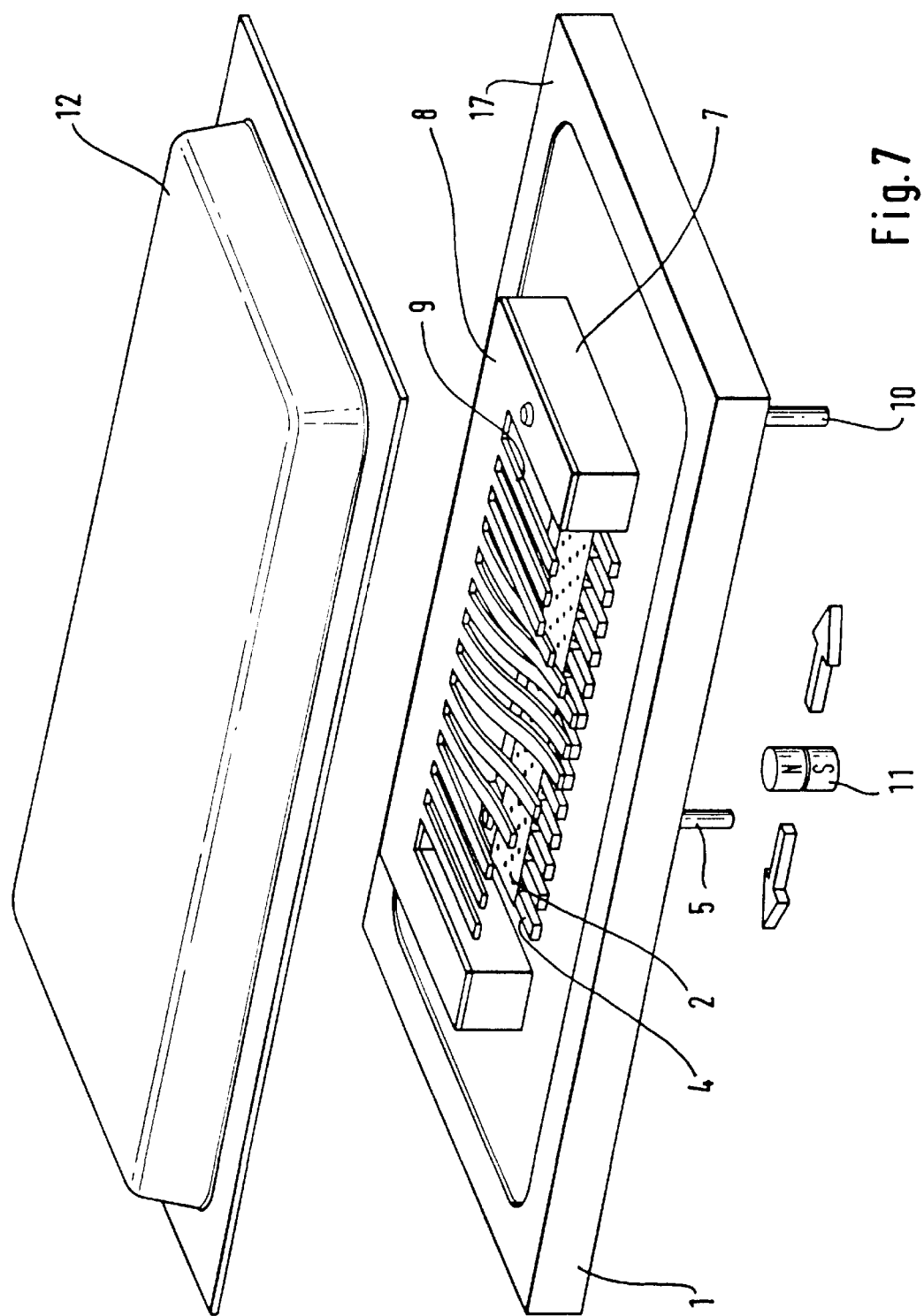
FIG. 7 shows the position sensor of the invention as rheostat.

The position sensor described can, however, not only be used as a potentiometer but also as a rheostat. As can be noted from FIG. 7, the resistance track 2 is in this case connected to a connection 5 and the flexure-beam structure is connected to the tap 10 for the tapping-off of a resistance signal.

The development of the magnetic position sensor as both potentiometer and rheostat are, as described, easily produced by a thick-film technique. In this connection, the thickness of the film is 5–50 $\mu$m. The width is approximately 0.2 mm and the length about 100 mm. The films are applied by the known thick-film technique with screen printing and then fired.

The resistance track 2 of the position sensor can be produced on the substrate however also by thin-film technique. In this case the thickness of the film is ordinarily 0.5 to 2 $\mu$m, the width of the film is selected between 5 $\mu$m and 5 mm, and the length of the film is 1 mm to 100 mm.

The conductive paths 3 lie either between substrate 1 and resistance track 2 or else, the resistance track 2 is arranged directly on the substrate 1 and the conductive paths 3 are arranged on the resistance path 2 in the configuration described. This has the advantage that the entire surface of a conductive path 3 can be used as contact surface 4 in the manner described. It is also possible for resistance track 2 and contact surfaces 4 to be applied in one layout to the substrate.

Figure 8:
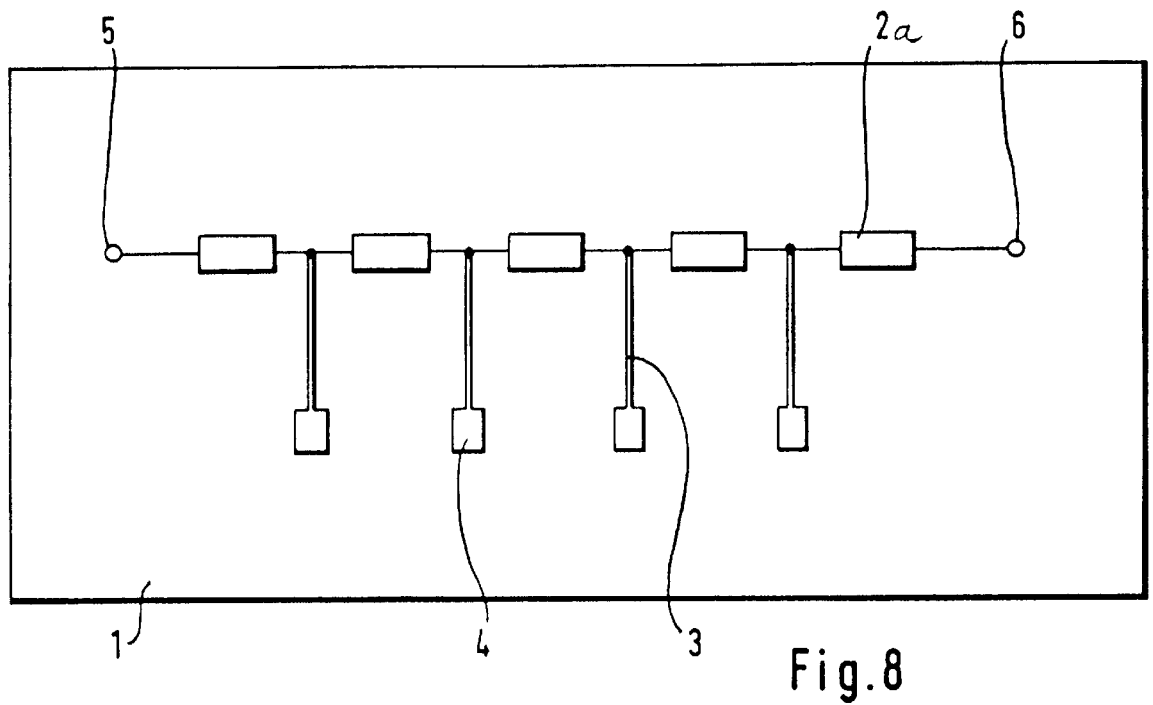
FIG. 8 shows the resistance network in the form of separate resistors.

In another embodiment, the resistance track 2, or network, consists of a series connection of n individual resistors. A contact surface 4 is associated via a conductive path 3 with each resistance junction (FIG. 8).

The contact surfaces 4 and the separate resistors 2a consist in this connection of different material, one of the resistors being at least 10 times more resistant than the conductive path 3.

The resistors 2a consist in this case of doped semiconductor material such as silicon or germanium and can be produced by the known semiconductor manufacturing processes.

In order to reduce the manufacturing tolerances, the film or individual resistors can be trimmed.

I claim:

1. A passive magnetic position sensor, comprising:
    a housing, and a substrate with a resistance network disposed on said substrate;
    a contact structure spaced apart from the resistance network and being deflectable under action of a magnet device to enable an electric connection, which is dependent on the position of the magnet device, to be produced between said resistance network and said contact structure;
    wherein the contact structure comprises a contact-spring structure;
    junction points of said resistance network are provided with contact surfaces disposed on the substrate, the contact surfaces being formed as paths of electrically conductive material in electrical contact with resistive material of the resistance network;
    said contact-spring structure is spaced apart from the contact surfaces which come into contact with said contact-spring structure under the action of said magnet device, wherein a corresponding element of the contact-spring structure is deflected by the magnet device into contact with a corresponding one of the contact surfaces of said resistance network;
    at least said contact surfaces and said contact-spring structure are contained in said housing;
    the magnet device is movable outside of said housing; and
    a stepped output signal is obtainable at the contact-spring structure as a function of a position of the magnet device, wherein a corresponding element of the contact-spring structure is deflected by the magnet device into contact with a corresponding one of the contact surface of said resistance network.

2. A passive magnetic position sensor, according to claim 1, wherein
    said housing is a tight housing; and
    said conductive paths are arranged at a predetermined distance apart on said substrate.

3. A passive magnetic position sensor according to claim 1, wherein
    said resistance network comprises a film-shaped resistance track.

4. A passive magnetic position sensor according to claim 3, wherein
    said track has a meander-shaped structure.

5. A passive magnetic position sensor according to claim 4, wherein the contact surfaces are connected directly to the meander-shaped structure.

6. A passive magnetic position sensor according to claim 3, wherein the resistance track has a thin-film structure.

7. A passive magnetic position sensor, according to claim 3, wherein the resistance track has a thick-film structure.

8. A passive magnetic position sensor, according to claim 2, wherein
    said conductive paths at predetermined distances apart are arranged in whole or in part on the resistance track.

9. A passive magnetic position sensor, according to claim 2, wherein
    said conductive paths are partially covered by the resistance track, and an end of each conductive path forms one of said contact surfaces.

10. A passive magnetic position sensor, according to claim 1, wherein
    said resistance network comprises separate individual resistors.

11. A passive magnetic position sensor, according to claim 10, wherein
    the individual resistors comprise doped semiconductor material.

12. A passive magnetic position sensor, according to claim 10, wherein the individual resistors comprise separately mounted fixed resistors.

13. A passive magnetic position sensor, according to claim 10, wherein the individual resistors are separate film resistors.

14. A passive magnetic position sensor, according to claim 10, wherein
    said housing is a tight housing; and
    said resistance network comprises conductive paths arranged at predetermined distance apart on said substrate;
    an end of each of said conductive paths forms one of said contact surfaces; and
    wherein the conductive paths have a lower resistance than the individual resistors of said resistance network.

15. A passive magnetic position sensor, according to claim 1, wherein the resistance network is trimmed in order to increase precision.

16. A passive magnetic position sensor, according to claim 1, wherein the contact surfaces are arranged on the substrate and are provided with a layer of a noble metal.

17. A passive magnetic position sensor, according to claim 1, wherein the substrate comprises a ceramic, silicon, glass, an epoxide circuit-board material, or an electrically insulating metal substrate material.

18. A passive magnetic position sensor, according to claim 1, wherein said contact-spring structure comprises separate contact springs.

19. A passive magnetic position sensor, according to claim 1, wherein
    said contact-spring structure is a one-piece flexure-beam structure.

20. A passive magnetic position sensor, according to claim 1, wherein
    said contact-spring structure comprises a soft-magnetic material.

21. A passive magnetic position sensor, according to claim 1, wherein
    said contact-spring structure comprises a non-magnetic material which has at least one magnetic layer.

22. A passive magnetic position sensor, according to claim 1, wherein
    said contact-spring structure comprises a noble-metal layer at least on an electric contact surface of the spring structure.

23. A passive magnetic position sensor, according to claim 1, wherein
   said contact spring structure comprises at least two contact springs which are actuatable simultaneously by the magnet device.

24. A passive magnetic position sensor, according to claim 1, wherein
   said contact-spring structure and said substrate comprise the same material.

25. A passive magnetic position sensor, according to claim 1, wherein
   said substrate is an insulating substrate, the insulating substrate serves as a wall of said housing, the housing further comprising a cover mating with said substrate.

26. A passive magnetic position sensor, according to claim 25, wherein
   said substrate and said housing cover comprise materials having the same or similar coefficients of thermal expansion.

27. A passive magnetic position sensor, according to claim 25, wherein
   said housing cover and said substrate are tightly soldered, welded or bonded together.

28. A passive magnetic position sensor, according to claim 24, wherein
   said substrate and said contact-spring structure comprise semiconductor material.

29. A passive magnetic position sensor, according to claim 28, wherein said housing is a plastic housing which tightly encapsulates said substrate and said contact-spring structure.

30. A passive magnetic position sensor, according to claim 1, further comprising said magnet device;
   wherein said magnet device has a prestressing against an outer side of said housing to be movable with light contact against said housing.

31. A passive magnetic position sensor, according to claim 30, further comprising a spring element producing the prestressing, and serving to receive said magnet device.

32. A passive magnetic position sensor, according to claim 1, wherein there is at least one electric connection of said resistance network and an electric connection of said contact-spring structure which are sealed-off from an outside of the housing.

* * * * *